United States Patent
Raouf et al.

(10) Patent No.: US 9,148,746 B2
(45) Date of Patent: Sep. 29, 2015

(54) METHOD AND DEVICE FOR CONTROLLING THE ACCESS OF EQUIPMENT FOR A NETWORK OF THE MACHINE-TO-MACHINE TYPE TO THE RESOURCES OF A CELLULAR TELEPHONY NETWORK

(71) Applicant: SIERRA WIRELESS, Issy les Moulineaux (FR)

(72) Inventors: Djelal Raouf, Boulogne Billancourt (FR); Bruno Corlay, Nanterre (FR)

(73) Assignee: SIERRA WIRELESS, Issy-les-Moulineaux (FR)

( * ) Notice: Subject to any disclaimer, the term of this patent is extended or adjusted under 35 U.S.C. 154(b) by 166 days.

(21) Appl. No.: 13/780,422

(22) Filed: Feb. 28, 2013

(65) Prior Publication Data
US 2014/0087743 A1     Mar. 27, 2014

(30) Foreign Application Priority Data

Feb. 28, 2012   (FR) ..................................... 12/51807

(51) Int. Cl.
*H04W 72/00*   (2009.01)
*H04W 4/00*   (2009.01)
*H04W 76/04*   (2009.01)
(Continued)

(52) U.S. Cl.
CPC .......... *H04W 4/005* (2013.01); *H04W 52/0216* (2013.01); *H04W 52/0258* (2013.01); *H04W 72/04* (2013.01); *H04W 76/048* (2013.01); *H04W 60/02* (2013.01); *Y02B 60/50* (2013.01)

(58) Field of Classification Search
CPC . H04W 52/0216; H04W 4/005; H04W 60/02; H04W 72/04

USPC .................................................. 455/450, 419
See application file for complete search history.

(56) References Cited

U.S. PATENT DOCUMENTS

2005/0119008 A1* 6/2005 Haumont .................... 455/456.1
2010/0189033 A1* 7/2010 Erlmann et al. .............. 370/328
(Continued)

FOREIGN PATENT DOCUMENTS

WO    WO 2011/087233    7/2011

OTHER PUBLICATIONS

Bruno Corlay "WP6—Device Improvements—D6.2 Final specification of the energy-efficiency implementation", *exalted website*, Feb. 29, 2012, pp. 13-16.

(Continued)

*Primary Examiner* — Khalid Shaheed
*Assistant Examiner* — Ernest Tacsik
(74) *Attorney, Agent, or Firm* — Nixon & Vanderhye, PC (57) ABSTRACT

The present invention concerns a method for controlling access by an equipment for a network of the machine-to-machine type to the resources of a cellular telephony network, said equipment comprising means for wireless communication with another equipment for a machine-to-machine network. The method is characterised in that it comprises the following steps:
  defining at least one so-called activity time range and at least one so-called inactivity time range,
  enabling the equipment to access the resources of the cellular telephony network during each activity time range, and
  preventing the equipment from accessing the resources of the cellular telephony network during each inactivity time range.

7 Claims, 5 Drawing Sheets

(51) Int. Cl.
*H04W 72/04* (2009.01)
*H04W 52/02* (2009.01)
*H04W 60/02* (2009.01)

(56) References Cited

U.S. PATENT DOCUMENTS

2010/0279676 A1* 11/2010 Benn et al. .................. 455/419
2012/0115454 A1* 5/2012 Liao ............................ 455/418

OTHER PUBLICATIONS

Samsung: Idle standby time analysis for MTC device, 3PGG Draft, vol. RAN WG2, no. Beijing, china, Apr. 6, 2010, entire document.

Vodafone: "Call forwarding, paging and long periodic timers", 3PGG Draft, vol. CT WG1, no. Malta, Aug. 29, 2011, entire document.

Search Report for FR 1251807, dated Jan. 7, 2013.

* cited by examiner

METHOD AND DEVICE FOR CONTROLLING THE ACCESS OF EQUIPMENT FOR A NETWORK OF THE MACHINE-TO-MACHINE TYPE TO THE RESOURCES OF A CELLULAR TELEPHONY NETWORK

This application claims priority to FR 1251807 filed Feb. 28, 2012, the entire content of which is hereby incorporated by reference.

The present invention concerns a method for controlling access by an equipment for a network of the machine-to-machine type to the resources of a cellular telephony network.

Equipment for a so-called machine-to-machine network is known. This term machine-to-machine (M2M) is a term used in computing and telecommunication for designating the technologies enabling two machines to exchange information. This type of network is for example deployed in a dwelling for, for example, the remote monitoring of this dwelling and/or the environment thereof. This is achieved by the collection of data generated by measuring equipment, wireless sensors, generally networked with a domestic gateway.

This equipment for machine-to-machine network, often referred to as M2M equipment, is provided with means for wireless communication with another equipment for a machine-to-machine network.

The need to use cellular telephony networks for transmitting the data collected by M2M equipment to another M2M equipment situated at a long distance, for example on another site, has been identified.

However, integrating this M2M equipment in a cellular telephony network poses several technical problems.

Indeed, a cellular telephony network is designed to ensure that a user, through his apparatus, is in a position to receive a call, to make a call, to receive data or to transmit data without any delay whatever the cell of the network to which his apparatus is attached. Thus the apparatus is not always connected to the network, but connectivity is always possible and can occur at any time.

Access to the services deployed on a cellular telephony network is dependent on the prior registration of the apparatuses, meaning, among other things, on the allocation of a connection context that will enable these apparatuses to communicate the data thereof via the network. A connection context is called PDP Context in the 2G and 3G standards (3GGP 22.060) and EPS Bearer in the LTE standard (3GPP 23.401 and 24.301). The PDP or EPS Bearer connection context contains an IP (Internet Protocol) address plus service quality parameters such as the minimum rate.

The initial registration is usually performed by a so-called attachment procedure and then, once the apparatus is registered with a network, by an updating procedure that is then used to follow the movement of this apparatus vis-à-vis the cellular telephony network.

Thus, by enabling a large number of M2M equipments to register with the cellular telephony network in order to communicate with each other via this cellular telephony network, the overhead data transmitted are liable to saturate or contribute to saturate the network infrastructure in case of simultaneous access. M2M equipment, which sends data only very rarely, is also liable to carry out periodic updates of its registration with the cellular telephony network, which also causes firstly a significant increase in the energy consumption of this equipment and therefore a reduction in its battery life and the period between two maintenance phases of this equipment, and secondly an increased expenditure of network resources both with regard to bandwidth consumption and to hardware resources that ensure the functioning of this network. These updates cannot be omitted for M2M equipment otherwise its connection context will be lost and therefore it will be necessary to once again proceed with a complete registration of this equipment with the network as soon as this equipment has to send data once again. Moreover, the loss of the IP address (of the connection context) by an M2M equipment cannot be envisaged since any other equipment knowing this IP address of the M2M equipment could then no more join this equipment.

A new registration of the M2M equipment with the cellular telephony network is also inadvisable since it unavoidably implies the negotiation of a new connection context, which usually proves detrimental through the length of time taken for the continuity of a service deployed on the machine-to-machine network. In addition, negotiating a new connection context requires additional exchanges between the M2M equipment and the network equipment, which implies energy expenditure for the M2M equipment.

The problem solved by the present invention is to overcome the above mentioned drawbacks.

To this end, the present invention concerns a method for controlling access by an equipment for a network of the machine-to-machine type to the resources of a cellular telephony network, said equipment comprising means for wireless communication with another equipment for a machine-to-machine network. The method is characterised in that it comprises the following steps:
defining at least one so-called activity time range and at least one so-called inactivity time range,
enabling the equipment to access the resources of the cellular telephony network during each activity time range, and
preventing the equipment from accessing the resources of the cellular telephony network during each inactivity time range.

Imposing activity and inactivity time ranges on an M2M equipment, which are moreover known to the cellular telephony network, allows regulating the activity of these items of equipment between them at each instant, which ensures the cohabitation and continuity of the services deployed between these items of equipment on a machine-to-machine network and conventional telephony services. In addition, the method releases periods during which the M2M equipment has no activity, according to the data that this equipment needs to send or receive from another M2M equipment. This adaptation of the durations of the activity and inactivity time ranges can therefore be optimised according to equipment so that these items of equipment can save resources to the maximum possible extent and therefore increase their operational life.

Advantageously, since the equipment that is to be registered with the cellular telephony network in order to access the resources of this network and the updating of this registration depends on the counting down of at least one counter, the counting down of this or these counters is suspended during each inactivity time range.

One of the advantages of suspending the counting down of these counters during each inactivity time range artificially increases their duration beyond what is usually given. This therefore enables this equipment to remain longer in a very low consumption operating mode and to emerge therefrom only when it has to send data, in other words only occasionally.

According to a variant, updating this registration depends on the counting down of at least one counter on the network side and of one counter on the equipment side.

According to a variant, no mechanism of discovery of the equipment in the network is used during each inactivity period.

This equipment discovery mechanism is a mechanism at the initiative of the network, which requests M2M equipment to allocate resources to establish a connection between the network and this equipment. Network resources (radio, server) are therefore economised by implementing this variant of the method.

According to a variant, an attachment confirmation message being received by the equipment when it is registered with the cellular telephony network, said message contains information that defines at least one activity time range.

According to a variant, a message used when the equipment is operating in connected mode contains information that defines at least one activity time range.

The M2M equipment then deduces therefrom the inactivity time ranges as a complement to the activity time ranges.

According to a variant, an attachment demand message that is sent by the equipment when it is registered contains information that defines at least one activity time range and at least one inactivity time range.

The M2M equipment can thus propose to the network NET a new operating cycle (alternation between inactivity and inactivity time ranges). The network NET can then either accept this new operating cycle or refuse it.

According to one of its hardware aspects, the present invention also concerns a device for controlling the access by equipment for a network of the machine-to-machine type to the resources of a cellular telephony network, said equipment comprising means for wireless communication with another equipment for a machine-to-machine network. The device is characterised in that it comprises means for:
- defining at least one so-called activity time range and at least one so-called inactivity time range,
- enabling the equipment to access the resources of the cellular telephony network during each activity time range, and
- preventing the equipment from accessing the resources of the cellular telephony network during each inactivity time range.

According to another of its hardware aspects, the present invention concerns equipment for a network of the machine-to-machine type comprising means for accessing the resources of a cellular telephony network. Such equipment is characterised in that it also comprises means for:
- recording at least one so-called activity time range and at least one so-called inactivity time range,
- allowing itself to access the resources of the cellular telephony network during each activity time range, and
- preventing itself from accessing the resources of the cellular telephony network during each inactivity time range.

According to one embodiment, the equipment comprising means for registering with the cellular telephony network for accessing the resources of this network and at least one counter used, the counting down of which is used for updating this registration, said equipment also comprises means for suspending the counting down of this or these counters during each inactivity time range.

Figure 1:
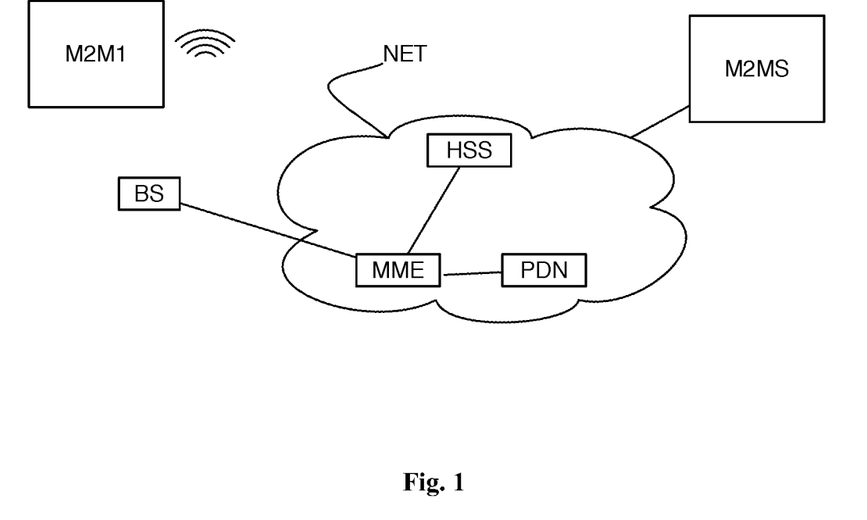
FIG. 1 shows an example of a device for controlling the access by equipment with small resources to a cellular telephony network.

The features of the invention mentioned above, as well as others, will emerge more clearly from a reading of the following description of an example embodiment, said description being made in relation to the accompanying drawings, among which:

FIG. 1 shows an example of a cellular telephony network NET such as for example a network NET of the packet switching type such as 2G or 3G or of the evolved packet switching type such as 3G or 4G (including LTE, Long Term Evolution).

This network NET comprises conventional equipment such as PDN gateways, or equipment fulfilling conventional functions and known by the abbreviations MME (Mobility Management Entity), HSS (Home Subscriber Server) or BS (Base Station), etc.

Two items of M2M equipment, M2M1 and M2MS, are herein considered by way of example. The M2M1 equipment is for example a home management unit in a dwelling and the M2MS equipment is a server grouping together the data issuing from this dwelling.

According to one of its aspects, the present invention concerns a method of controlling the access of the M2M1 equipment to the resources of the network NET for the purpose of communicating with the M2MS equipment.

During the method, at least one so-called activity time range and at least one so-called inactivity time range are defined.

Each M2M equipment then knows at least one activity time range and one inactivity time range and each of these ranges is known to the network NET.

These activity and inactivity time ranges are for example predefined when a service of an operator is subscribed to, or communicated by equipment of the machine-to-machine network.

Each M2M equipment is then authorized to access the resources of the network NET during each activity time range, and this equipment cannot (prohibition) access these resources during each inactivity time range.

This method can be implemented on cellular telephony networks such as for example the 3G or LTE network. Hereinafter, an embodiment of this method will be described when implemented in an LTE network without limiting the scope of the invention to this type of network.

In an LTE network (3GPP TS 23.401 "GPRS enhancements for E-UTRAN access") access to services is available only to registered equipment. The initial equipment registration is implemented by an attachment procedure, whereas this registration is maintained by an update procedure.

During the attachment procedure, an M2M equipment sends a message requesting attachment to the network NET, in this case an MME equipment that will be responsible for this equipment. This MME equipment then creates a connection context particular to this equipment and then sends, to this M2M equipment, the created context in an attachment confirmation message. A connection context is stored by the MME equipment or the HSS equipment for each registered equipment. For example, a connection context comprises an IP (Internet Protocol) address that is allocated by the network to this equipment. Such a context exists as long as the registration of the equipment lasts. Where the equipment is cancelled, meaning is no longer registered, the context is lost, which may imply the loss of the IP address thus allocated to this equipment. Cancellation occurs in particular when the equipment does not succeed in periodically updating its registration status vis-à-vis the network according to the update procedure.

It is usual for this update procedure to be periodic according to a period fixed by the network NET and for this procedure to use at least one network hosted counter (NHT) (mobile reachable timer in the LTE standard, 3GPP document TS 24.301) and a device hosted counter (DHT) (T3412 in the LTE standard, 3GPP document TS 24.301).

During the attachment procedure, the two counters NHT and DHT are initialised with the same predetermined value. The two counters begin to count down from the end of the attachment procedure and stop counting down only when a dedicated link is successfully established between the M2M equipment and an equipment in the network NET (typically as long as no service request is initiated by the M2M equipment). The two counters are then reset to their initial values and restart their counting down following loss of the link established or at the end of the connection between the M2M equipment and this network equipment.

If the DHT counter breaks down (reaches 0), the M2M equipment must begin the update procedure so as to maintain its context in the network NET.

If the NHT counter breaks down and the update procedure had not been initiated by the M2M equipment, another counting down of the counter DNHT (Detach Network hosted timer, 3GPP document TS 24.301) is initiated and it is only at the expiry of this last counter DNHT that the connection context is truly lost for the M2M equipment. If the M2M equipment initiates the update procedure before the counter DNHT breaks down or even successfully initiates a dedicated connection with the network, the connection context is maintained.

It will therefore be understood, through this example, that the connection context is lost at the expiry of one or more successive counters.

Implementation of the method according to the present invention in such an LTE network is dependent on the definition of activity and inactivity time ranges for each M2M equipment, in this case the M2M1 and M2MS equipment in FIG. 1.

This definition may be the result of negotiations between providers of the cellular telephony network and service providers for the machine-to-machine network so as to regulate access of the M2M equipment to the resources of the network NET. During the inactivity time ranges, each M2M equipment may use a drastic mechanism for saving on its energy resources, thus prolonging its service life.

Implemented in a network of the LTE type as described above, the equipment accesses the resources of the cellular telephony network according to a cycle composed of activity and inactivity time ranges.

In addition, according to a variant, during each inactivity time range, no mechanism of discovery of the equipment in the network (paging) is implemented during each inactivity period.

According to a variant, the attachment confirmation message (Attach accept message) that is received by an M2M equipment at the time of its initial registration with the network NET contains information that defines at least one activity time range.

According to a variant, a message, for example an EMM message (piggybacking EMM messages), used when the M2M equipment operates in connected mode, contains information that defines at least one activity time range.

According to a variant, the attachment demand message that is sent by the M2M equipment during the attachment procedures (at the time of its registration) contains information that defines at least one activity time range and at least one inactivity time range.

According to a variant, the information that defines the activity time ranges is recorded in an equipment, for example HSS, of the network NET.

The method allows greatly extending the duration of the counting down of the counters, which count down their values only during the activity time ranges. By choosing these activity time ranges spaced apart in time, in particular when for M2M equipment that sends only a very small amount of effective data via the network NET, the number of exchanges between this equipment and the network for updating their registration with the MME equipment is greatly reduced, thus limiting the use of both the network resources and the M2M equipment resources.

The method can also be implemented in networks of the 2G or 3G type.

In the case of a 2G network, the connection context is usually lost when the counter NHT breaks down. In this case, implementing the method consists of the counting down of this counter being suspended during each inactivity time range.

In the case of a recent 3G network and LTE networks, two counters are used: NHT and IDT (Implicit Detach Timer). When the counter NHT breaks down, the counting down of the IDT counter commences and it is only when this IDT counter breaks down that the connection context is lost. During the counting down of this IDT counter, the equipment cannot communicate with another equipment but the equipment can initiate an update procedure in order to "reactivate" its connection context. In this case, implementing the method consists of the counting down of the counter NHT being suspended during each inactivity time range.

Figure 2:
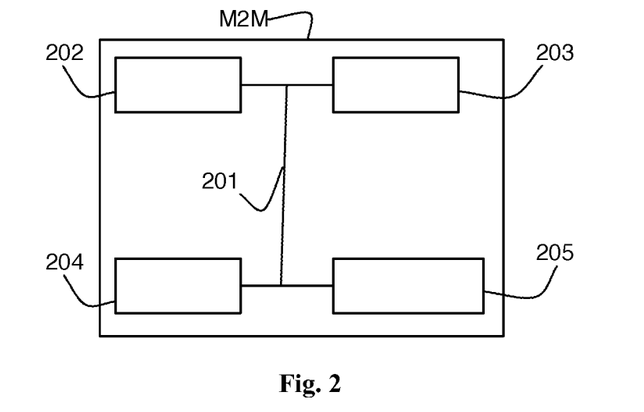
FIG. 2 illustrates schematically the architecture of M2M equipment partially implementing the method of FIG. 1.

FIG. 2 shows the architecture of M2M equipment implementing the method of FIG. 1.

The M2M comprises, connected by a communication bus 201, hardware resources that are very limited in terms of capacities, namely:
  a processor, microprocessor or microcontroller 202;
  a Random Access Memory RAM 203;
  a memory 204 of the ROM (Read Only Memory) type or flash or rewritable but remanent memory (such as a USB key);
  means 205 for interfacing with the cellular telephony network NET.

The microcontroller 202 is capable of executing instructions loaded into the RAM 203 from the memory 204. When the M2M equipment is powered up, the microcontroller 202 is capable of reading instructions from the RAM 203 and executing them. These instructions form a computer program which causes the implementation, by the microcontroller 202, of all or some of the methods described above in relation to FIG. 1.

The M2M equipment comprises means for recording at least one so-called activity time range and at least one so-called inactivity time range, for example the memory 204. It also comprises means for enabling itself accessing to the resources of the cellular telephony network during each activity time range and to prevent itself from accessing the resources of the cellular telephony network during each inactivity time range. These means are formed by the microcontroller 202, which cooperates with the memories 204 and RAM for example.

According to one embodiment, the M2M equipment comprises means for registering with the cellular telephony network in order to access the resources of this network and at least one counter used, the counting down of which is used for updating this registration. These means can be formed by the means 202, 203, 204 and 205, which then cooperate with each other. The M2M equipment also comprises means for suspending the counting down of this or these counters during each inactivity time range. These means may be formed by the means 202, 203, 204 and 205, which then cooperate with each other.

All or some of the methods described above in relation to FIG. 1 can be implemented in software by execution of a set of instructions by a programmable machine, such as a DSP (Digital Signal Processor) or a microcontroller, such as the microcontroller 202, or be implemented in hardware by a machine or a dedicated component such as an FPGA (Field-Programmable Gate Array) or an ASIC (Application-Specific Integrated Circuit).

Figure 3:
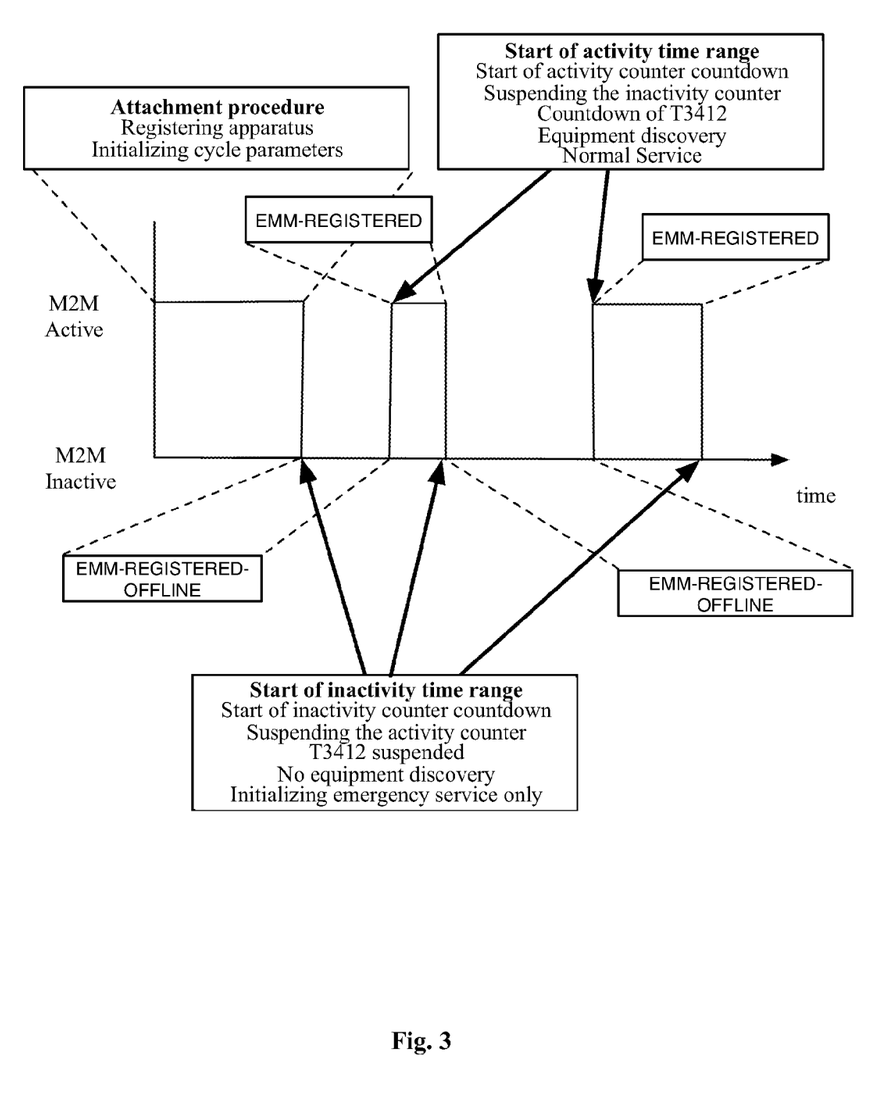
FIG. 3-6 show illustrations of the implementation of a communication cycle relating to the control method of the present invention.

FIG. 3 shows an example of an activity time diagram of M2M equipment observing the activity cycles as defined herein. The diagram begins with a phase of acquisition of the communication cycle parameters during an attachment procedure. The M2M equipment then begins an inactivity time range as soon as the attachment procedure ends for a predetermined period and then enters an activity time range, a range during which the next activity time range may optionally be programmed either by means of dedicated messages or through messages exchanged in connected mode. The states of an EMM (EPS Mobility Management) controller are also shown according to the activity time ranges of the M2M equipment.

The functions provided by mobile equipment are supervised by a certain number of state machines or essential automatic controllers. The EMM controller is one of these, which is in charge of the mobility and security aspects of the equipment. The radio connection of an equipment with a base station is for its part supervised by an RRC (Radio Resource Control) automatic controller. When a point to point connection must be established with the base station, the EMM controller controls the establishment of a radio link between the two equipment to the RRC controller (a procedure usually referred to as service request). An RRC controller is for example described in the 3GPP standard TS 36.331. The RRC controller is responsible for establishing this link and optionally informing the EMM controller of the result. In the event of success, the controller moves from the RRC-IDLE state, which corresponds to the RRC state of passive equipment and to the listening to the radio environment, to the RRC-CONNECTED state, which is that of equipment benefitting from a dedicated radio connection to the base station.

Figure 4:
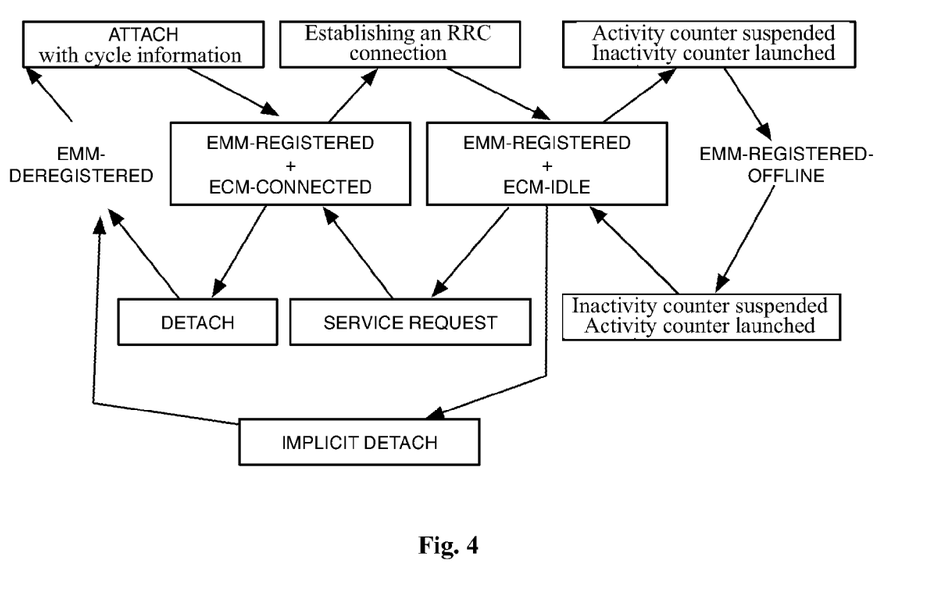

FIG. 4 shows a state diagram of an EMM controller in which a communication cycle defined according to the method of the present invention is implemented.

The EPS standards (§4.6 of the document 3GPP TS 23.401 "GPRS enhancements for E-UTRAN access" and §5.1.3.2 of the document 3GPP TS 24.301 "NAS protocol for EPS stage 3") define a method with several states for managing mobility between EPS networks. The EMM controller identifies and maintains communication connections between several mobile equipments, which may move or connect via several EPS networks.

The EMM controller defines several states, including the EMM-IDLE state, which is equal to the ECM-IDLE state, the EMM-CONNECTED state, which is equal to the ECM-CONNECTED state, and the EMM-DEREGISTERED and EMM-REGISTERED states.

These states of an EMM controller described in the 3GPP standard TS 24.301 and present both in the equipment and the network describe the following statuses:

EMM-DEREGISTERED: this is the state of equipment not attached to the network and also the state in which equipment will start up.

EMM-REGISTERED: this is the state of equipment that has managed to register with a network. It is the optimum operating state of equipment, and all the services to which it can lay claim are accessible.

EMM-IDLE: this is the state of equipment that is not proceeding with any communication, typically an idle state during which the equipment is listening to its radio environment.

EMM-CONNECTED: this is the state of equipment in communication.

It should be noted that the EMM-IDLE and EMM-CONNECTED states can be combined with the EMM-REGISTERED and EMM-DEREGISTERED states; these are not exclusive states, quite the contrary.

Implementing the method according to the present invention in an EMM controller consists, according to one embodiment, of adding a new state EMM-REGISTERED.OFFLINE, which is the combination of the states EMM-REGISTERED and ECM-IDLE.

In the EMM-REGISTERED.OFFLINE state, no equipment discovery mechanism is initiated toward an equipment, the NHT (mobile reachable timer) and DHT counters are suspended, inactivity counters are launched in the M2M equipment and in the MME equipment, activity counters in the M2M and MME are suspended and emergency services are the only ones authorized to be initiated by the M2M equipment.

When the EMM controller leaves the EMM-REGISTERED.OFFLINE state, the equipment discovery mechanism becomes possible again, the NHT and DHT counters are relaunched, the inactivity counters are suspended in the M2M equipment and in the MME equipment, the activity counters are launched in the M2M equipment and in the MME equipment and the restrictions standard to the services are applied.

Figure 5:
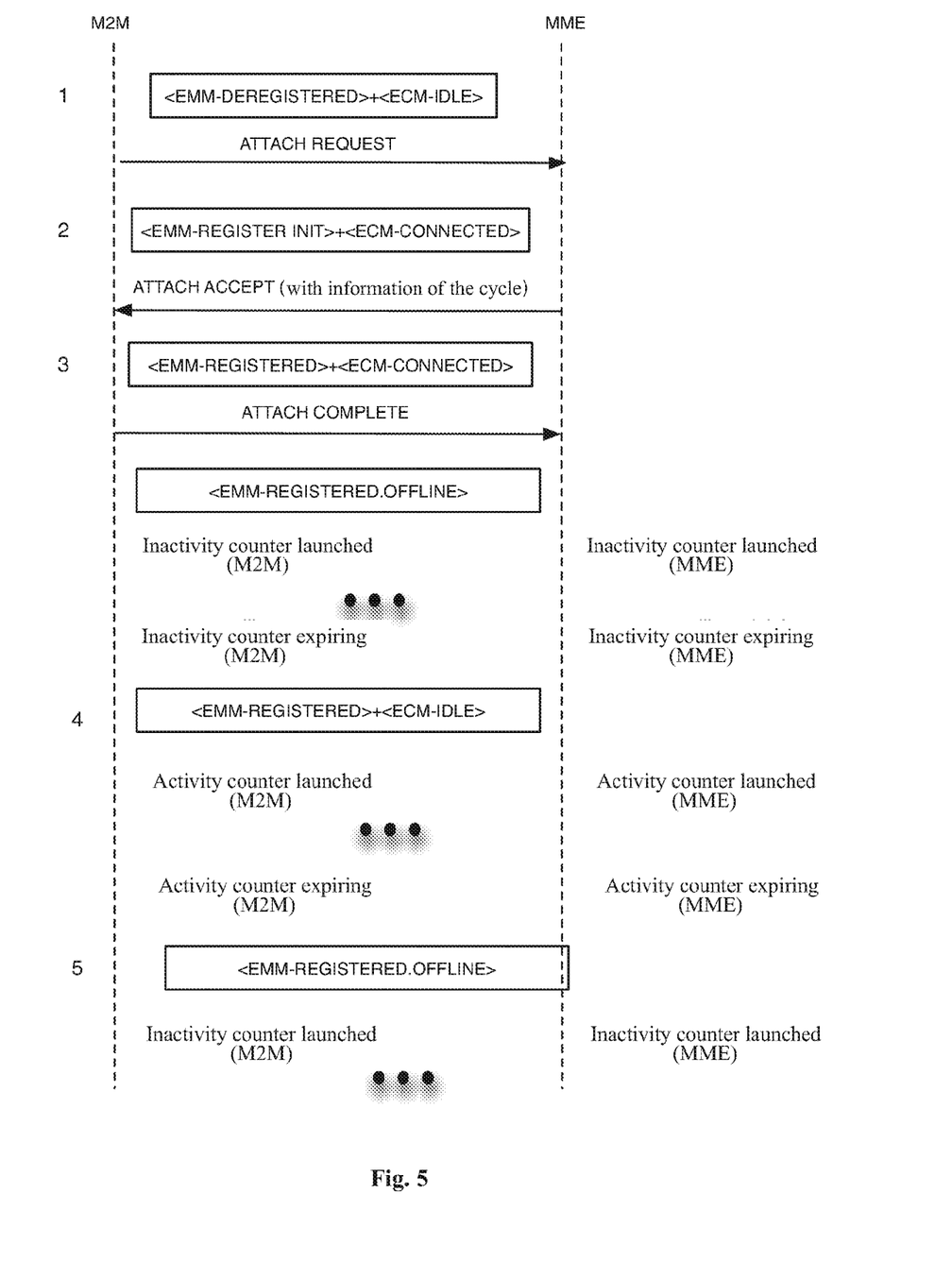

FIG. 5 shows schematically an example of a scenario for an equipment to obtain parameters relating to a communication cycle according to the present invention.

At step 1, the M2M equipment initiates an attachment procedure. When the RRC controller reaches the connected state, the EMM controller is capable of transmitting its ATTACH REQUEST message. The ATTACH REQUEST message may or may not include a communication cycle request from the M2M equipment. The M2M equipment reaches the EMM-REGISTERED-INITIATED state following the fruitful transmission of the ATTACH REQUEST message.

At step 2 the M2M equipment receives the ATTACH ACCEPT message, a message with the parameters relating to a new communication cycle. These parameters include for example the period up to the next activity time range and the duration of this time range. If the message ATTACH REQUEST includes a request for a communication cycle, from the M2M equipment, the parameters received acknowledge or force the communication cycle. The EMM controller reaches the EMM-REGISTERED state following the reception of the message ATTACH ACCEPT.

At step 3, the M2M equipment confirms to the MME equipment by means of the ATTACH COMPLETE message that it has received the message and that it will apply the parameters of the received communication cycle. When the RRC connection ends, inactivity counters are created from the parameters of the communication cycle for the M2M and MME equipments, and their countdowns are launched while the EMM controller reaches the EMM-REGISTERED. OFFLINE state. Only emergency services can then be initiated by the M2M equipment. In accordance with the description of the EMM-REGISTERED.OFFLINE state, the counters NHT and DHT are suspended.

At step 4, when the inactivity counters expire, the EMM controller reaches the EMM-REGISTERED and ECM-IDLE states and the activity counters are launched in the M2M and MME equipments. Requesting a service is then possible. The counters NHT and DHT resume their counting down.

At step 5, when the activity counters expire, the EMM controller switches to its EMM-REGISTERED.OFFLINE state and the inactivity counters are relaunched with the last received value (here with the message ATTACH ACCEPT). The counters NHT and DHT are suspended.

The method continues with steps 2, 3, 4, 5 etc.

Figure 6:
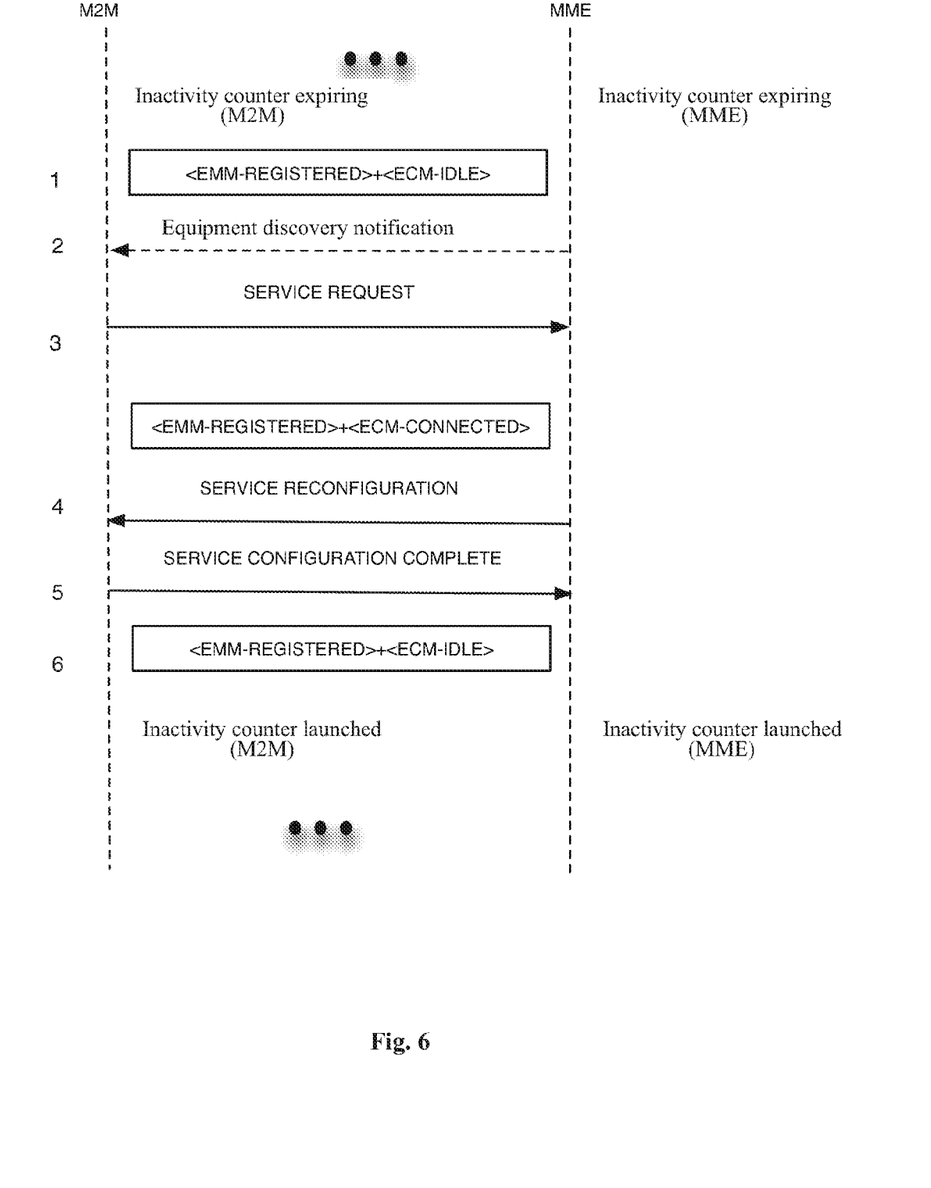

FIG. 6 shows schematically an example of a scenario for an equipment to reconfigure a communication cycle according to the present invention.

At step 1, following the expiry of the inactivity counters, the EMM controller switches to the EMM-REGISTERED and ECM-IDLE states. The activity counters are launched as well as the counters NHT and DHT. The equipment discovery mechanism then becomes possible as well as normal access to the services (according to a prior subscription).

At step 2, the MME equipment needs to impose a particular communication cycle on the M2M equipment. So as to reach the M2M equipment, an equipment discovery procedure is initiated and the EMM controller in the M2M equipment is notified at its low levels (OSI models).

At step 3, so as to respond to the discovery procedure, the EMM controller initiates a service request procedure and transmits a SERVICE REQUEST message when the RRC controller reaches the RRC_CONNECTED state. The message SERVICE REQUEST may or may not include parameters of a particular communication cycle that has been requested by the M2M equipment. The EMM controller switches to its EMM-REGISTERED and ECM-CONNECTED states.

At step 4, the parameters of the new communication cycle are received by the M2M equipment in the SERVICE RECONFIGURATION REQUEST message and this message can acknowledge the communication cycle previously requested or force new cycles. The EMM controller remains in its state.

At step 5, the M2M equipment acknowledges the transmission of the parameters of the communication cycle in a message SERVICE RECONFIGURATION COMPLETE, which it transmits to the MME equipment. While the RRC controller launches its connection and reaches its RRC_IDLE state, the EMM controller switches to its EMM-REGISTERED and ECM-IDLE states.

At step 6, when the activity counters expire, the items of M2M and MME equipments switch to the EMM-REGISTERED.OFFLINE state and launch their inactivity counters with the parameters of the new communication cycle.

If the activity counters expire during a service reconfiguration procedure, the procedure is maintained until it is finished. The EMM controller reaches the EMM-REGISTERED.OFFLINE state as soon as the RRC loses it connection and moves to the RRC-IDLE state.

The invention claimed is:

1. Method for controlling the access by an equipment for a network of the machine-to-machine type to the resources of a cellular telephony network, said equipment being configured for wireless communication with another equipment for a machine-to-machine network, the method comprising:
obtaining at least one so-called activity time range and at least one so-called inactivity time range,
enabling the equipment to access the resources of the cellular telephony network during each activity time range, and
preventing the equipment from accessing the resources of the cellular telephony network during each inactivity time range,
characterised in that, the equipment having to be registered with the cellular telephony network to access the resources of the network, the registration being implemented by an attachment procedure, and the updating of the registration depending on the counting down of at least one counter, the counter or counters being initialised at a predetermined value during the attachment procedure, the counting down of the counter or counters is suspended during each inactivity range, the counting down of the counter or counter resuming during an activity period following an inactivity period, with a value corresponding to the last value taken by the counter or counter during the last activity period.

2. Method according to claim 1, wherein the updating of this registration depends on the counting down of at least one counter on network side and of one counter on equipment side.

3. Method according to claim 1, wherein no mechanism for discovering the equipment in the network is used during each inactivity period.

4. Method according to claim 1, wherein, an attachment confirmation message being received by the equipment when it is registered with the cellular telephony network, said message contains information that defines at least one activity time range.

5. Method according to claim 1, wherein a message used when the equipment operates in connected mode contains information that defines at least one activity time range.

6. Method according to claim 1, wherein an attachment request message that is sent by the equipment during the registration contains information that defines at least one activity time range and at least one inactivity time range.

7. Device for controlling access of an equipment for a network of the machine-to-machine type to the resources of a cellular telephony network, said equipment being configured for wireless communication with another equipment for a machine-to-machine network, the device being configured for:
obtaining at least one so-called activity time range and a least one so-called inactivity time range,
enabling the equipment to access the resources of the cellular telephony network during each activity time range, and
preventing the equipment from accessing the resources of the cellular telephony network during each inactivity time range,
characterised in that, the equipment having to be registered with the cellular telephony network to access the resources of the network, the registration being implemented by an attachment procedure, and the updating of the registration depending on the counting down of at least one counter, the counter or counters being initialised at a predetermined value during the attachment procedure, said device is adapted to suspend the counting down of the counter or counters during each inactivity time range, the counting down of the counter or counters resuming during an activity period following an inactivity period, with a value corresponding to the last value taken by the counter or counters during the last activity period.

* * * * *